United States Patent [19]
Feret, Jr.

[11] 3,953,045
[45] Apr. 27, 1976

[54] FERRETT BAG AND CART

[76] Inventor: Valentine G. Feret, Jr., 7095 Valleygreen, Washington, Mich. 48093

[22] Filed: Mar. 20, 1975

[21] Appl. No.: 560,502

[52] U.S. Cl. .............................. 280/638; 150/1.5 B; 280/DIG. 6
[51] Int. Cl.² ............................................ B62B 1/12
[58] Field of Search ................... 280/34 B, DIG. 6; 150/1.5 R, 1.5 B, 52 G

[56] References Cited
UNITED STATES PATENTS

| | | | |
|---|---|---|---|
| 1,562,030 | 11/1925 | Lawrence | 150/1.5 R |
| 2,760,782 | 8/1956 | Hartzell | 280/DIG. 6 |
| 2,783,054 | 2/1957 | Stratton, Jr. | 280/DIG. 6 |
| 2,950,748 | 8/1960 | Olinghouse | 150/1.5 R |
| 2,962,294 | 11/1960 | Elms | 280/34 B X |
| 3,150,881 | 9/1964 | Van Skyock | 280/DIG. 6 |
| 3,334,910 | 8/1967 | Wilson et al. | 150/1.5 B |

Primary Examiner—M. H. Wood, Jr.
Assistant Examiner—Michael J. Forman

[57] ABSTRACT

A combination golf bag and golf cart for use upon a golf course for transportation of golf clubs and balls, and which includes a hollow lower body where golf playing equipment may be placed and which is enclosed on top by a removable top body, the lower body being supported upon a pair of wheels for travel over a ground, and the device also including a pivotable handle by which the device may be pulled, the handle when in non-use is pivoted upwardly so to fit under the upper body.

3 Claims, 8 Drawing Figures

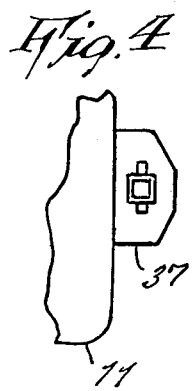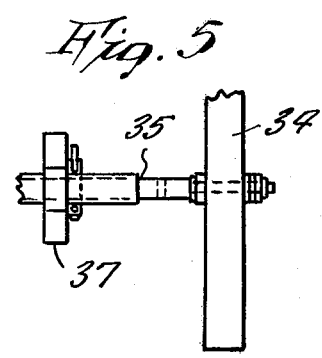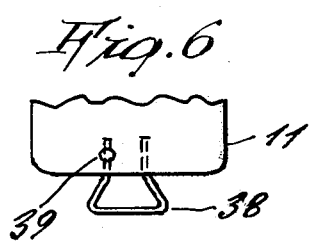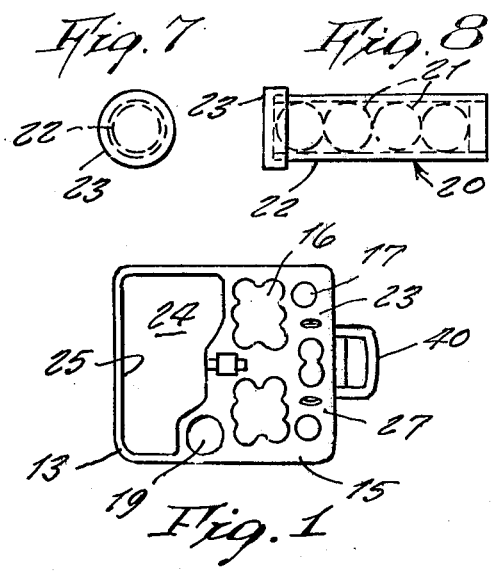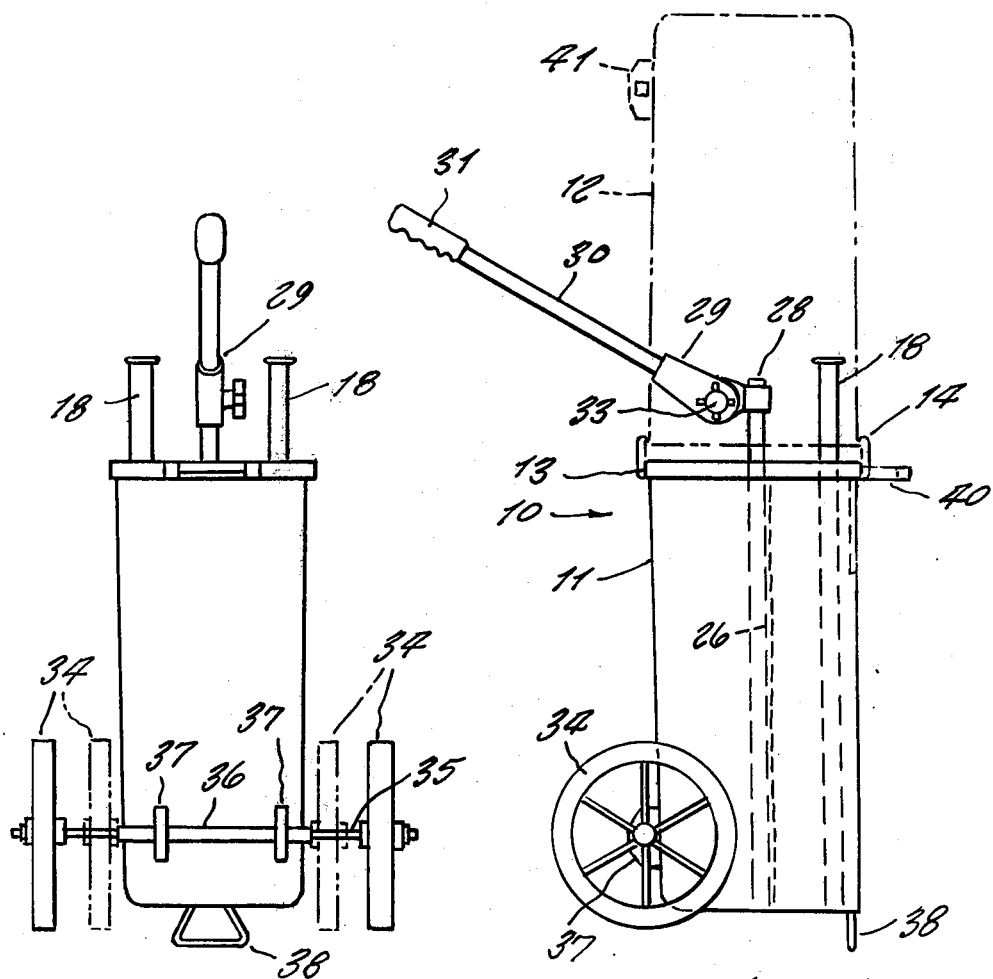

FERRETT BAG AND CART

This invention relates to golf playing equipment.

A principal object of the present invention is to provide a combination golf bag and golf cart for use by a player in transporting his playing equipment around a golf course.

Another object is to provide a Ferrett Bag and Cart which is lightweight when compared to a conventional cart and bag.

Still another object is to provide a Ferrett Bag and Cart which protects golf clubs during transit and also during storage.

Still another object is to provide a Ferrett Bag and Cart which has no zippers so to break.

Yet another object is to provide a Ferrett Bag and Cart which includes specifically positioned tubes for receiving golf clubs so that the golf clubs are specifically placed, whereby the clubs are organized so to be easily individually selected in use.

A further purpose of the present invention is to provide a Ferrett Bag and Cart which when not in use can be locked up like a luggage and which includes no hinges.

A still further object is to provide a Ferrett Bag and Cart which is adaptable to use on electric carts or otherwise may be used as a bag and cart or used as a bag without the wheels.

Other objects are to provide a Ferrett Bag and Cart which is simple in design, inexpensive to manufacture, rugged in construction, easy to use and efficient in operation.

These and other objects will become readily evident upon a study of the following specification together with the accompanying drawing wherein:

FIG. 1 is a top view of the invention shown with the upper body removed therefrom;

FIG. 2 is a side elevation view of the invention;

FIG. 3 is a rear elevation view thereof;

FIG. 4 is a fragmentary side elevation view showing a wheel bearing plate construction;

FIG. 5 is an enlarged fragmentary detail view of a wheel shaft associated with the bearing shown in FIG. 4;

FIG. 6 is a fragmentary front elevation view showing the cart rest;

FIG. 7 is an end view of a ball container;

FIG. 8 is a side view thereof.

Referring now to the drawing in detail, the reference numeral 10 represents a Ferrett Bag and Cart, according to the present invention, wherein the same includes a lower body 11 and an upper body 12 removably placeable thereupon. The bodies 11 and 12 are made from a plastic material such as is used for Samsonite luggage. The lower body has a separator and lower track 13, and the upper body has an upper track 14. Thus the bodies are slideably engaged together.

The lower body is hollow and includes a top wall 15 having configurated openings 16 and 17 for receiving tubes 18 and golf clubs inserted into the openings. An opening 19 in top wall 15 forms a receptacle to receive ball tube 20 that contains a plurality of golf balls 21. The ball tube 20 includes cylindrical case 22 fitted at one end with a removable cap 23.

An opening 24 of large size is also provided in top wall 15 for the purpose of receiving various other items and provides an entrance to a forward compartment 25 that may be separated by a vertical partition or plate 26 from the areas receiving the tubes and golf clubs.

Additionally, eye bolts 27 are also provided as shown.

A main post 28 protrudes upwardly through a top of the lower body 11 and which at its upper end supports an adjustable handle assembly 29 that includes straight handle 30 fitted on its end with a handlebar grip 31. The handle assembly 29 is pivotable about a transverse pin 33 so that it is adjustable between the position shown in FIG. 2 and a vertically upward position so that when in the position shown in FIG. 2, it can be used for pulling the cart, and when in the upwardly vertical position, it can be stored underneath the upper body 12.

The lower body is supported upon a pair of wheels 34 rotatably mounted upon opposite ends of axle 35 and wherein each wheel is free to slide along the axle between the positions shown in solid line and the positions shown in dotted line so that the cart wheels can readily adjust themselves to the terrain upon which they travel. The axle 35 extends through an axle tube 36 supported in brackets 37 integrally formed upon a front side of the lower body 11.

A cart rest 38 is secured to an underside of the lower body and is positioned near the rear edge thereof, the cart rest including a spring loaded pin construction 39.

A fixed handle assembly 40 is also mounted on a rear side of the lower body and near its upper edge.

A rest foot and axle support 41 is formed integrally on a front side of the upper body 12, as shown.

Thus there is provided a Ferrett Bag and Cart which is of novel design and which has numerous advantages for golf players.

While various changes may be made in the detailed construction, it is understood that such changes will be within the spirit and scope of the present invention as is defined by the appended claims.

What I now claim is:

1. In a golf equipment carrier having a bag, said bag comprising a lower body and an upper body, said bodies being made of plastic material and each being hollow to enclose golf playing equipment, said upper body being removably placeable upon said lower body, a separator and lower track provided upon an upper edge of said lower body and an upper track being provided upon a lower edge of said upper body, said lower body being supported upon a pair of wheels for traveling across a ground, said lower body having a pair of forwardly extending brackets upon its front side, said brackets supporting an axle which at each end is inserted through the center of said wheels, and an underside of said lower body also being provided with a cart rest for maintaining said lower body in vertical, upstanding position while at rest, said lower body including a main post at its center and extending vertically upwardly to a top of said lower body, and an upper end of said main post having an adjustable handle assembly secured pivotally thereto, said handle assembly including a straight handle which at its outer end is fitted with a handle bar grip, said handle assembly being pivotable between a sideward extending position and a vertical, upright position for fitting under said upper body.

2. The combination as set forth in claim 1, wherein, said lower body includes a top wall provided with a plurality of configurated openings into which are selectively fitted a plurality of tubes with golf balls and a singular receptacle receive golf clubs.

3. The combination as set forth in claim 2, wherein, said ball tube comprises a cylindrical container containing a plurality of golf balls, one end of said container having an opening closeable by a removable cover.

* * * * *